United States Patent
Blancke et al.

(10) Patent No.: US 12,533,471 B2
(45) Date of Patent: Jan. 27, 2026

(54) DRUG DELIVERY DEVICE

(71) Applicant: Sanofi, Paris (FR)

(72) Inventors: Stefan Blancke, Frankfurt am Main (DE); Michael Jugl, Frankfurt am Main (DE); Anthony Paul Morris, Warwick (GB); Matthew Meredith Jones, Warwick (GB); William Geoffrey Arthur Marsh, Warwick (GB); Samuel Steel, Warwick (GB)

(73) Assignee: SANOFI, Paris (FR)

( * ) Notice: Subject to any disclaimer, the term of this patent is extended or adjusted under 35 U.S.C. 154(b) by 1049 days.

(21) Appl. No.: 17/424,044

(22) PCT Filed: Jan. 22, 2020

(86) PCT No.: PCT/EP2020/051454
§ 371 (c)(1),
(2) Date: Jul. 19, 2021

(87) PCT Pub. No.: WO2020/152192
PCT Pub. Date: Jul. 30, 2020

(65) Prior Publication Data
US 2022/0096754 A1    Mar. 31, 2022

(30) Foreign Application Priority Data

Jan. 24, 2019 (EP) .................... 19305091

(51) Int. Cl.
*A61M 5/20* (2006.01)
*A61M 5/24* (2006.01)
*A61M 5/315* (2006.01)

(52) U.S. Cl.
CPC .......... *A61M 5/31528* (2013.01); *A61M 5/20* (2013.01); *A61M 5/31585* (2013.01); *A61M 5/24* (2013.01); *A61M 2005/31508* (2013.01)

(58) Field of Classification Search
CPC .... A61M 5/31528; A61M 5/20; A61M 5/315; A61M 5/31585; A61M 2005/31508;
(Continued)

(56) References Cited

U.S. PATENT DOCUMENTS

| 2010/0036326 | A1 | 2/2010 | Matusch |
| 2014/0107587 | A1 | 4/2014 | Hogdahl |

(Continued)

FOREIGN PATENT DOCUMENTS

| CN | 1835774 | 9/2006 |
| CN | 101484198 | 7/2009 |

(Continued)

OTHER PUBLICATIONS

International Preliminary Report on Patentability in International Application No. PCT/EP2020/051454, dated Jul. 27, 2021, 8 pages.

(Continued)

*Primary Examiner* — William R Carpenter
*Assistant Examiner* — William R Frehe
(74) *Attorney, Agent, or Firm* — Bond Schoeneck & King PLLC

(57) ABSTRACT

A drug delivery device, comprising:
a housing,
a plunger arranged within the housing and movable along a longitudinal axis and adapted to push a piston within a container in a distal direction, the plunger being prevented from rotating and comprising an external thread,
a drive nut arranged within the housing and comprising an internal thread engaging the thread of the plunger, an axial bearing arranged between the drive nut and the housing to limit axial movement of the drive nut relative to the housing,
a mechanism configured to exert a force on the drive nut in the distal direction through a rotatable component
(Continued)

coupled to the drive nut for joint rotation and at least one non-rotatable component, wherein a bearing is arranged between the at least one rotatable component and the at least one non-rotatable component, the bearing having a smaller diameter than the axial bearing.

18 Claims, 9 Drawing Sheets

(58) Field of Classification Search
CPC ............ A61M 5/24; A61M 2005/3126; A61M 5/31526; A61M 5/31501; A61M 5/31576; A61M 5/31578; A61M 5/3158
See application file for complete search history.

(56) References Cited

U.S. PATENT DOCUMENTS

| | | | |
|---|---|---|---|
| 2015/0374924 A1 | 12/2015 | Keitel et al. | |
| 2016/0045665 A1* | 2/2016 | Bayer | A61M 5/315 604/207 |
| 2017/0259011 A1 | 9/2017 | Nielsen | |
| 2017/0266387 A1 | 9/2017 | Keitel et al. | |

FOREIGN PATENT DOCUMENTS

| | | |
|---|---|---|
| CN | 105764545 | 7/2016 |
| CN | 106999662 | 8/2017 |
| JP | 2016-507302 A | 3/2016 |
| JP | 2016-514590 A | 5/2016 |
| WO | WO 2005/018721 | 3/2005 |
| WO | WO 2006/045528 | 5/2006 |
| WO | WO 2006/063123 | 6/2006 |
| WO | WO 2010/149209 | 12/2010 |
| WO | WO 2010/149396 | 12/2010 |
| WO | WO 2014/166909 | 10/2014 |
| WO | WO 2015/074979 | 5/2015 |
| WO | WO 2016/055620 | 4/2016 |
| WO | WO 2016/102526 | 6/2016 |
| WO | WO 2017/001692 | 1/2017 |
| WO | WO 2019/102027 | 5/2019 |

OTHER PUBLICATIONS

International Search Report and Written Opinion in International Application No. PCT/EP2020/051454, dated Mar. 24, 2020, 11 pages.

* cited by examiner

DRUG DELIVERY DEVICE

CROSS REFERENCE TO RELATED APPLICATIONS

The present application is the national stage entry of International Patent Application No. PCT/EP2020/051454, filed on Jan. 22, 2020, and claims priority to Application No. EP 19305091.1, filed on Jan. 24, 2019, the disclosures of which are incorporated herein by reference.

TECHNICAL FIELD

The disclosure generally relates to a drug delivery device.

BACKGROUND

From the state of the art, wind-up injection devices are known where a torque applied by the user upon a user handle such as a rotatable dial grip is transferred along a drive train to wind up and/or wind down a rotational energy storage unit such as a torsion spring. The rotational energy storage unit drives a rotationally drivable expelling mechanism. When the rotational energy storage is released, a drug dose corresponding to the accumulated rotational energy is delivered.

It is further known that the drive train may comprise a ratchet for maintaining a rotatable element at one of a number of discrete angular positions against the torque load of the rotational storage unit, whereby the ratchet is switchable from one position to an adjacent position by application of a torque to the user handle.

SUMMARY

An aspect of the present disclosure relates to an improved drug delivery device by the concept of newly introducing and/or appropriately adapting a dependency between the internal state in the drivetrain of a variable dose wind-up delivery mechanism and the extent of frictional cooperation at selected interfaces within this drivetrain for the purpose of achieving a more homogenous operation throughout the entire range of allowed states. More specifically, the term "state" may be understood to include "kinematic states" and "load states" as well. Hereinafter, the term "kinematic state" may be understood to encompass all kind of absolute and relative positions and orientations of driver train elements that belong to allowed operational situations of the drivetrain as a whole whereas the term "load state" may be understood to encompass all kind of forces and torques acting on drivetrain elements during allowed operational situations. Insofar, all kinds of inherent frictional forces occurring along interfaces of drivetrain members during allowed operation are also included in the meaning of the term "load state". In order to properly delimit inherent friction against the friction based concepts proposed by the present disclosure the latter ones shall be referred to as "modulated dependency of friction" or, shorter, as "modulated friction" in view of the overall target to result in a more equilibrated drivetrain operation.

According to the present disclosure, a modulated dependency between friction and the kinematic state may be implemented along two generally different lines in view of the typical situations where the drivetrain can be understood as an temporary combination by means of a releasable rotational connection which is made of an alternating dose setting unit on one hand side and a dose-by-dose unidirectional forward stepping expelling unit on the other hand side.

Here, along the first of these lines, the present disclosure provides approaches for modulating the frictional effects occurring in the dose setting unit in course of dose setting and/or dose expelling operation. This may be useful relative to wind-up mechanisms of the so-called "energize-on-dial" type, wherein the mechanical energy needed for the expelling operation is directly taken from the energy supplied by the user in course of the dose setting operation. Especially, this may be applied with favourable results to wind-up mechanisms based on mechanical springs or similar mechanical strain reservoirs with a more or less significant non-constant relation between the applied force and the resulting deformation or vice versa. For example, metal torsion springs as commonly used in wind-up delivery mechanism have an approximately linear dependency between the strain torque and the wind-up angle, the so-called spring rate. This linear behaviour is, in many applications, considered to be a drawback and therefore addressed, within the limits of costs and packaging, by the use of springs with a widely flat rate and by applying higher initial bias at the same time.

Along the second line mentioned before, in addition or as an alternative to the approaches of the first line, modulated dependency of friction along with the kinematic state of the expelling portion of the drivetrain may be introduced. This, in particular, may be helpful in connection with fully pre-powered or pre-strained delivery systems that already have an amount of energy stored in the initial configuration of the drivetrain suitable for expelling of the full amount of drug liquid in the container. In the way of a general concept it should become apparent from these considerations that an appropriate implementation of the concepts should seek for a modification of the frictional effect(s) on the kinematic level where the non-homogenous behaviour is primarily introduced. The more specific embodiments presented subsequently will provide the skilled reader with an idea on that, for example, the non-linear drive torque in a torsion spring wind-up mechanism may be compensated to a remarkable extent by the concept of a modulated dependency of friction to the rotational state of the drivetrain.

Further, in addition to the approaches set out before or standalone, a modulated dependency between an interface friction and a load state in the drivetrain may be introduced. Again, this could be applied to the dose setting portion and the expelling of portion of the drivetrain as well. In typical situations, however, the dose setting portion is not subject to significant variations to its load state that are not more or less directly linked to the kinematic state. As an illustration thereof, the load state in an "energize-on-dial" dose setting portion is predominantly dependent on the kinematic state thereof, namely on the amount of wind-up angle applied thereto, which, finally corresponds to the dose setting. It might therefore, in general, appear more appropriate to seek for modulated friction for compensating non-homogenous or non-constant operational behaviour because of variations in external resistances that affect the internal load state of the drivetrain, which typically applies rather to the expelling portion thereof. A well-known external resistance subject to significant variation is the reaction force from the cartridge bung which acts against the output member of the expelling portion of the drivetrain. Apparently, the cartridge bung reaction force depends not only on the friction of the bung against the cartridge vial but also includes to some extent the flow resistance of the drug liquid through the cannula. In respect thereto, another bunch of influencing conditions are quite well-known as, for example, the maybe temperature dependent viscosity of the drug liquid, the diameter of the needle passage, the length of the needle and the pressure the individual tissue maintains at the injection site.

According to an aspect of the present disclosure, a drug delivery device comprises:
- a housing,
- a plunger arranged within the housing, the plunger being movable along the longitudinal axis and adapted to push a piston within a medicament container in a distal direction, the plunger being prevented from rotating and comprising an external thread,
- a drive nut arranged within the housing, the drive nut comprising an internal thread engaging the external thread of the plunger, wherein an axial bearing is arranged between the drive nut and the housing to prevent or limit axial movement of the drive nut relative to the housing,
- a mechanism configured to exert a force on the drive nut in the distal direction through at least one rotatable component coupled to the drive nut for joint rotation and at least one non-rotatable component, wherein a bearing is arranged between the at least one rotatable component and the at least one non-rotatable component, the bearing having a smaller diameter than the axial bearing.

In an exemplary embodiment, the at least one non-rotatable component comprises a button configured to be depressed in a distal direction.

In an exemplary embodiment, the at least one rotatable component comprises a drive sleeve arranged in the housing and movable along a longitudinal axis between a proximal position in which the drive sleeve is prevented from rotating and a distal position in which the drive sleeve is allowed to rotate about the longitudinal axis.

In an exemplary embodiment, the button abuts the drive sleeve at least when being depressed.

In an exemplary embodiment, the drive nut and the drive sleeve are coupled for joint rotation but allowed to move axially relative to each other.

In an exemplary embodiment, the at least one rotatable component further comprises a sleeve spring arranged between the drive sleeve and the drive nut biasing the drive sleeve and the drive nut apart along the longitudinal axis.

In an exemplary embodiment, the drug delivery device further comprises a drive mechanism configured to exert a drive torque on the drive sleeve and/or on the drive nut.

In an exemplary embodiment, the bearing is a point bearing.

In an exemplary embodiment, the button engages the drive sleeve in the point bearing.

In an exemplary embodiment, the drug delivery device further comprises a button spring biasing the button in a proximal direction.

In an exemplary embodiment, a spline is arranged between the drive sleeve and the housing to prevent rotation of the drive sleeve when the drive sleeve is in a proximal position, wherein the spline is adapted to disengage when the drive sleeve is moved into a distal position so that the drive sleeve can rotate.

In an exemplary embodiment, the drug delivery device further comprises a plunger spline arranged to prevent rotation of the plunger relative to the housing.

In an exemplary embodiment, the drug delivery device further comprises a drive spline between the drive sleeve and the drive nut adapted to couple the drive sleeve and the drive nut for joint rotation relative to the housing but allowing for axial movement of the drive sleeve relative to the drive nut.

In an exemplary embodiment, the drive mechanism comprises a torsion spring configured to rotate the drive sleeve and/or the drive nut relative to the housing.

In an exemplary embodiment, at full depression of the button, the drive sleeve is configured to abut the drive nut.

In an exemplary embodiment, the sleeve spring is dimensioned such that upon full depression of the button, the frictional torque of the axial bearing is certain to be less than the drive torque of the drive mechanism.

In an exemplary embodiment, a force multiplier is arranged in a force propagation path between the drive nut and the button.

In an exemplary embodiment, the force multiplier comprises at least one support on the housing, wherein the button spring is configured as a diaphragm spring which is part of a non-rotating part of the force propagation path, wherein an outer edge of the button spring is coupled to the support while a center region of the button spring is engaged by the button, wherein an intermediate part is arranged between the button spring and the drive sleeve such that the bearing is between the intermediate part and the drive sleeve.

In an exemplary embodiment, the intermediate part comprises a number of proximal protrusions or a circumferential proximal edge engaged by a part of the button spring between the outer edge and the center region.

In an exemplary embodiment, the axial bearing is configured to have reduced friction in the distal direction of load but configured to act as a brake in the proximal direction of load.

In an exemplary embodiment, the axial bearing comprises matching surfaces on the housing and on the drive nut, wherein the matching surfaces taper in the proximal direction.

The drug delivery device, as described herein, may be configured to inject a drug or medicament into a patient. For example, delivery could be sub-cutaneous, intra-muscular, or intravenous. Such a device could be operated by a patient or care-giver, such as a nurse or physician, and can include various types of safety syringe, pen-injector, or auto-injector.

The device can include a cartridge-based system that requires piercing a sealed ampule before use.

In combination with a specific medicament, the presently described devices may also be customized in order to operate within required specifications. For example, the device may be customized to inject a medicament within a certain time period. Other specifications can include a low or minimal level of discomfort, or to certain conditions related to human factors, shelf-life, expiry, biocompatibility, environmental considerations, etc. Such variations can arise due to various factors, such as, for example, a drug ranging in viscosity from about 3 cP to about 50 cP. Consequently, a drug delivery device will often include a hollow needle ranging from about 25 to about 31 Gauge in size. Common sizes are 27 and 29 Gauge.

Further scope of applicability of the present disclosure will become apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE FIGURES

The present disclosure will become more fully understood from the detailed description given below and the accompanying drawings, which are given by way of illustration only, and do not limit the present disclosure, and wherein.

Corresponding parts are marked with the same reference symbols in all figures.

DETAILED DESCRIPTION

Figure 1A:
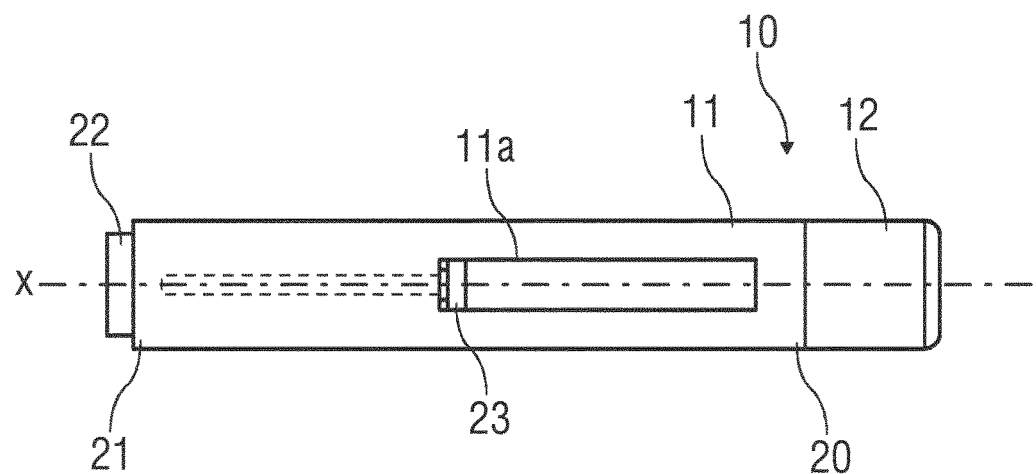
FIGS. 1A and 1B are schematic views of an exemplary embodiment of a drug delivery device.
Figure 1B:
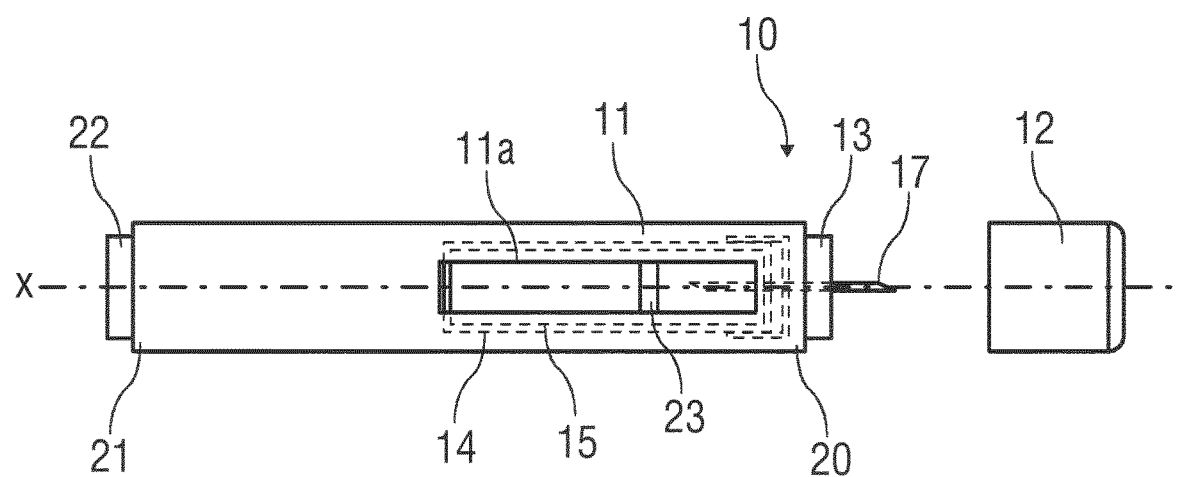

According to some embodiments of the present disclosure, an exemplary drug delivery device 10 is shown in FIGS. 1A and 1B.

Device 10, as described above, is configured to deliver or expel a liquid drug for injection into a patient's body. Device 10 includes a housing 11 which typically contains a reservoir containing the medicament to be injected (e.g., a syringe 24 or a container) and the components required to facilitate one or more steps of the delivery process. Device 10 may also include a cap assembly 12 that can be detachably mounted to the housing 11, e.g, on a distal or front end D of the device 10. Typically, a user must remove cap assembly or cap 12 from housing 11 before device 10 can be operated.

As shown, housing 11 may be substantially cylindrical and may have a substantially constant diameter along the longitudinal axis X. The housing 11 has a distal region 20 and a proximal region 21. The term "distal" refers to a location that is relatively closer to a site of injection, and the term "proximal" refers to a location that is relatively further away from the injection site.

Figure 2A:
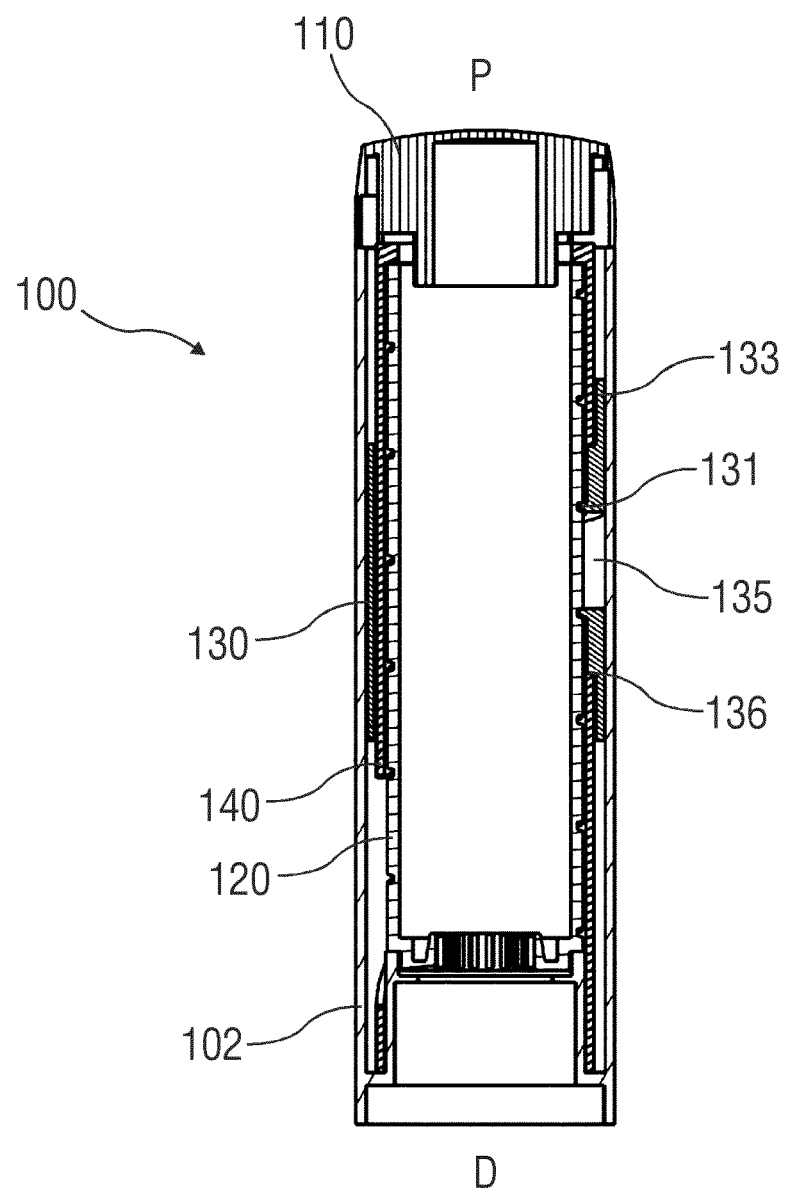
FIGS. 2A and 2B are schematic detail view of an exemplary embodiment of a drug delivery device.
Figure 2B:
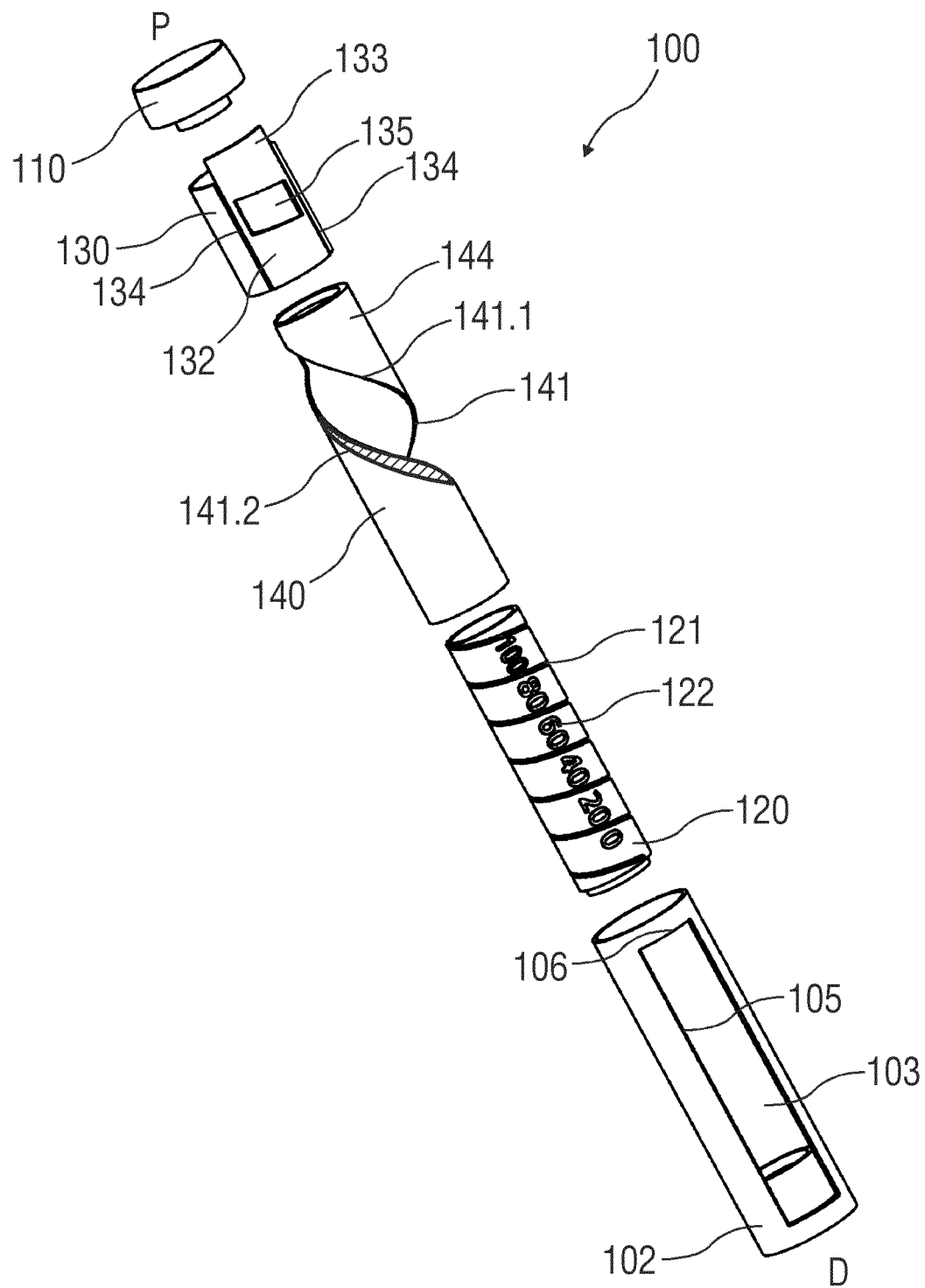

FIGS. 2A and 2B are schematic detail views of an exemplary embodiment of a dose dial and dose display assembly for a drug delivery device 100, e.g., for a spring driven injection pen, adapted to receive a non-shown cartridge containing a drug. At a proximal end of a housing 102, a dial button 110 is provided which a user can rotate to select a variable dose size. The housing 102 is further provided with a longitudinal window 103 allowing a user to visibly inspect a scale drum 120. The housing 102 may further be provided with an internal projection which supports the scale drum 120 in the distal direction D.

The interior of the scale drum 120 is preferably occupied by a spring driven dosing mechanism as e.g. disclosed in WO 2006/045528 A1 and, in more detail, in WO 2016/055620 A1. The entire disclosure of these publications shall be incorporated by reference herein.

The scale drum 120 is directly coupled to the dial button 110 to follow rotation of the dial button 110 such that when a user rotates the dial button 110 to select a dose, the scale drum 120 rotates together with the dial button 110. Both the dial button 110 and the scale drum 120 are arranged such that they both rotate without any axial displacement. The connection between the dial button 110 and the scale drum 120 can be made through a releasable coupling such that when the set dose is injected, the dial button 110 does not necessarily rotate back with the scale drum 120.

The longitudinal window 103 may be rectangular and have two longitudinal borders 105 extending in parallel to a longitudinal direction of the drug delivery device 100 and two transversal borders 106 being perpendicular to the longitudinal borders 105. The window 103 may be transparent or could alternatively be an opening in the housing 102. The longitudinal borders 105 can be provided with radially inwardly protruding ribs extending in the longitudinal direction. In this embodiment, the ribs may be molded throughout the entire length of the housing 102 such that the ribs are longer than the longitudinal borders 105 of the longitudinal window 103.

The scale drum 120 comprises an outer surface provided with a helical track or thread 121. Furthermore, the scale drum may carry indicia 122 which can be printed directly on the scale drum 120 or engraved or otherwise provided. In the disclosed embodiment, the indicia from "0" to "100" are helically provided on the scale drum 120, however only every tenth indicia 122 is shown in FIG. 2. While one of the indicia would be shown in a window 135, the neighboring indicia could also appear in the window 135, either fully or partly.

Figure 3:
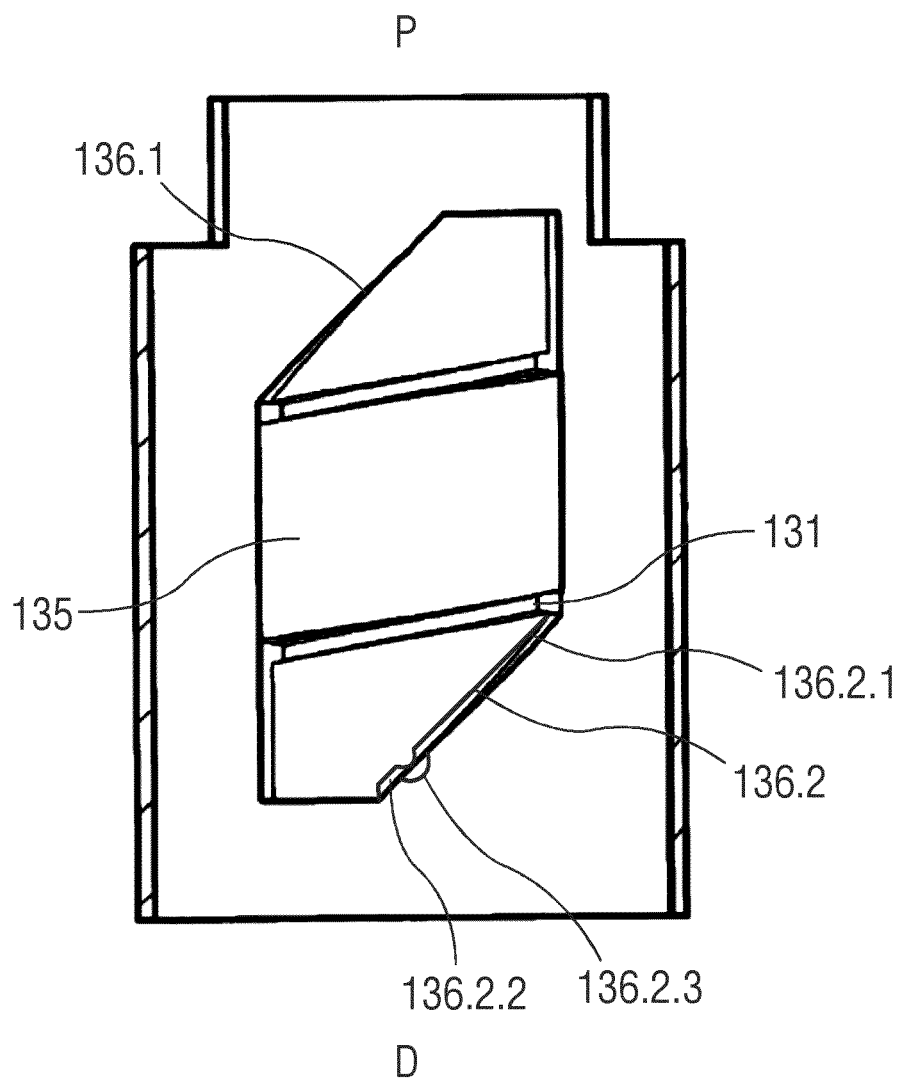
FIG. 3 is a schematic longitudinal section of a slider.

The external helical thread 121 of the scale drum 120 is engaged by a corresponding male thread 131 of a slider 130. FIG. 3 is a schematic longitudinal section of the slider 130. The slider 130 may be tubular and have a peripheral part 132 of its periphery prolonged by an extension 133 the purpose of which will be explained below. The periphery part 132 is provided between two recesses 134 which engage the two longitudinal ribs protruding radially inwardly from the longitudinal borders 105 of the housing 102 such that the slider 130 can only move axially. The periphery part 132 of the slider 130 is further provided with a window 135 through which the user can view the scale drum 120.

On two sides of the window 135, in particular proximally and distally from the window 135, a male thread 131 adapted to engage the helical thread 121 of the scale drum 120 is provided. Due to this engagement in combination with the engagement between the recesses 134 and the two longitudinal ribs protruding radially inwardly from the longitudinal borders 105 of the housing 102, the slider 130 moves axially whenever the scale drum 120 is rotated. The slider 130 is further provided with a helical guiding surface 136.1, 136.2 which interacts with a helical opening 141 in a sleeve 140 shown in FIG. 2. Whenever the slider 130 slides axially it forces the sleeve 140 to rotate due to this engagement between the opening 141 and the guiding surface 136.1, 136.2 of the slider 130. At its proximal end the sleeve 140 may have a collar which rests on the scale drum 120 however without being connected to the scale drum 120. The sleeve 140 therefore rotates independently of the scale drum 120. Further, at its proximal end the helical opening 141 may have an extended access opening facilitating assembly of the slider 130 in the helical opening 141.

In order to set a dose, the user rotates the dial button 110 which in turn rotates the scale drum 120. The rotation of the scale drum 120 in either direction is transferred to an axial movement of the slider 130. The axial movement of the slider 130 and thus the sliding window 135 relative to the longitudinal window 103 in the housing 102 is coordinated with the helical pattern of the indicia 122 printed on the scale drum 120 such that only one indicia 122 is present in the longitudinal window 103 and the sliding window 135 at the same time.

When the slider 130 moves axially, it forces the sleeve 140 to rotate and the peripheral areas 144 of the sleeve 140 surrounding the helical opening 141 will thus cover part of the scale drum 120 and thereby cover the remaining indicia 122 not to be visualized.

The axial length of the slider 130 is preferably sufficiently long to cover the visible part of the helical track 121 of the sleeve 140 in order to fully prevent the user from viewing the indicia 122 not in sight through the sliding window 135. It can therefore be advantageous to provide the periphery part 132 of the slider 130 with an extension 133. In order to fully utilize the length of the scale drum 120, the dose dial button 110 can be provided with a pocket for receiving this extension 133 when the slider 130 is in its most proximal position. A similar space may be provided at the distal end of the housing 102 to receive the slider 130. The distal part of the slider 130 can also be formed as an extended portion.

Such a spring driven dosing mechanism may comprise a torsion spring configured to rotate a threaded plunger engaged to a threaded portion of the drug delivery device to advance the plunger when the torsion spring is released or to rotate a drive nut which is axially fixed in the drug delivery device 100 and comprises a thread engaging a rotationally fixed plunger to advance the plunger when the torsion spring is released. The torsion spring may be tensioned by rotating a dose setting member such as the dial button 110. The housing 102 may further be connected to a not shown cartridge-holder provided at the distal end of the housing 102. This cartridge-holder may support a not shown cartridge containing the drug. The cartridge-holder can be exchangeable or irreversibly connected to the housing 102.

In conventional injection pens the helical opening 141 has a uniform width over its entire length. As opposed to this, the helical opening 141 of the present disclosure has a width which slightly increases towards the distal direction D, in particular in such a way that a pitch of a more distal edge 141.2 of the helical opening 141 is steeper than a pitch of a more proximal edge 141.1. Moreover, one of the helical guiding surfaces 136.1, 136.2, in particular the helical guiding surface 136.2 is configured as a resilient beam having a fixed end 136.2.1 attached to the slider 130 and a free end 136.2.2 opposite the fixed end 136.2.1, the resilient beam being configured to frictionally engage an edge, in particular the more distal edge 141.2, of the helical opening 141. The resilient beam may have a bump 136.2.3 configured to contact the edge of the helical opening 141. Depending on the width of the helical opening 141, i.e. depending on the axial position of the slider 130 relative to the sleeve 140, the resilient beam is more or less pre-tensioned. This pre-tension determines the friction between the resilient beam and the sleeve 140 during relative motion and thus the torque from the spring drive consumed by the scale display.

Due to the width of the helical opening 141 increasing in the distal direction D and the helical guiding surface 136.2 being configured as a resilient beam engaging an edge of the helical opening 141, the friction between the helical guiding surface 136.2 and the helical opening 141 decreases as the slider 130 travels in the distal direction D, i.e. toward the indicia "0" along the sleeve 140. This may compensate at least in part for a non-constant torque from the spring driven dosing mechanism.

The disclosed configuration may allow for adding friction to reduce the operating loudness of a clutch feature that resists spring torque within a spring driven dosing mechanism of a drug delivery device.

The disclosure provides additional functionality to a medical device that can be operated to deliver doses of medicament via a needle. The additional functionality involves the introduction of friction which works to resist the torque from a drive spring allowing a clutch feature that may also resist said torque to be weaker so that the operating loudness of the clutch feature is reduced.

By adding friction that tends to reduce the amount of torque acting at the dialling clutch at high dialled doses, the clutch teeth geometry or clutch spring force can be relaxed, reducing the loudness of dialling.

A number of locations for the introduction of friction are possible. These fall into two categories:

Interfaces related to the gauge, arranged so that friction is created at high dialled doses and gradually reduces to zero at low dialled doses. Within this category an embodiment involves varying the width of the gauge tongue to increasingly interfere with the gauge aperture within the body at large doses. This embodiment aims to minimise the effect of component tolerances on the axial force.

Friction between components that move relative to each other during dialling but that do not move relative to each other during dispense. This friction does not need to vary with dialled dose as it will not affect the usable output torque from the drive spring during dispense. Within this category an embodiment involves adding friction by introducing radial interference between a dial Grip and body. This embodiment aims to minimise the effect of component tolerances on the axial force.

The addition of the friction does not in itself alter the dialling noise or feel. However, it enables a more relaxed clutch teeth interface, which will then reduce the dialling loudness.

Figure 4:
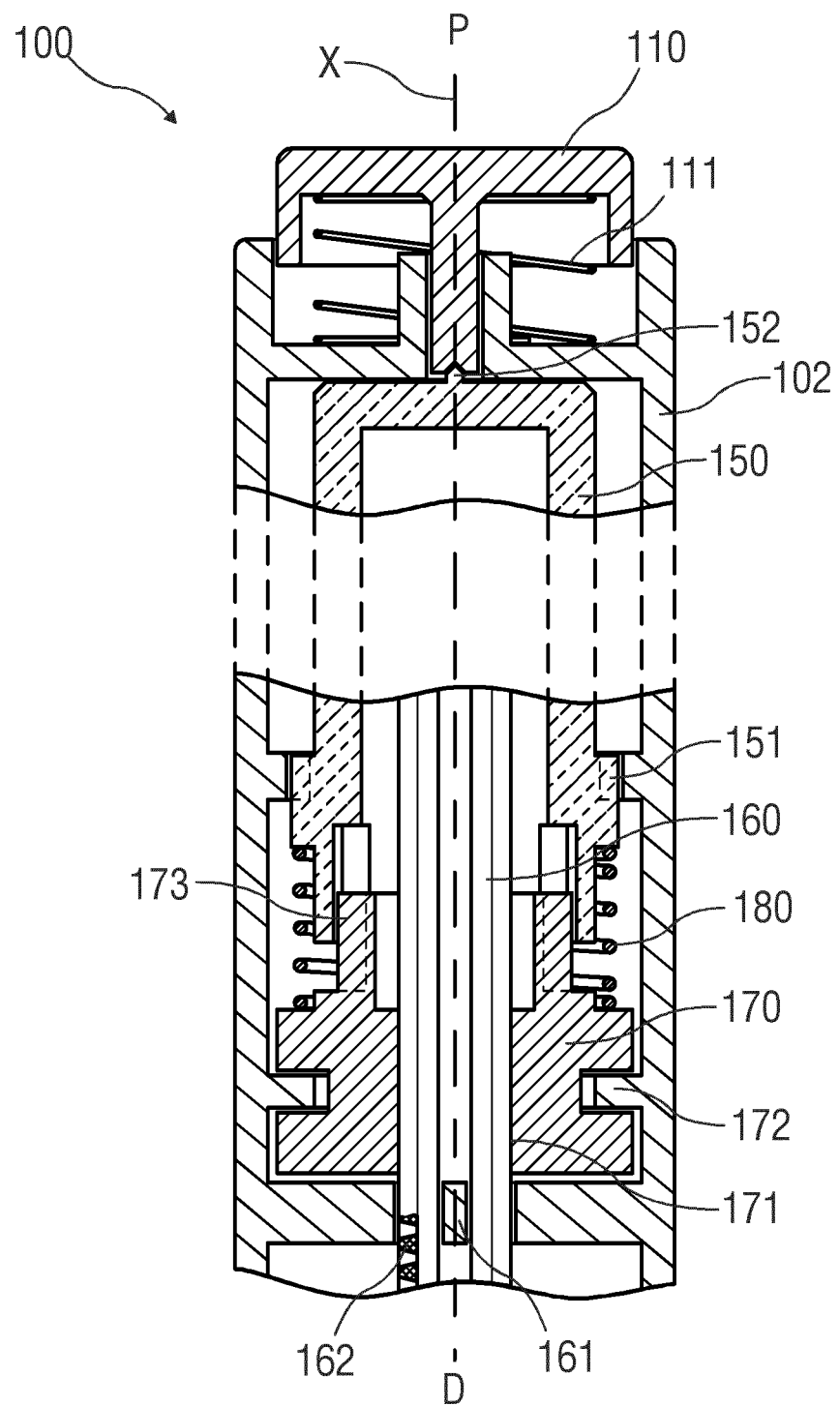
FIG. 4 is a schematic detail view of an exemplary embodiment of an drug delivery device.

FIG. 4 is a schematic detail view of an exemplary embodiment of an expelling portion in the drivetrain of drug delivery device 100, e.g. in an injection pen adapted to receive a non-shown cartridge containing a drug. At a proximal end of a housing 102, a button 110 is arranged which may be depressed in the distal direction D. A low-force button spring 111 may be provided for biasing the button 110 in the proximal direction P. This low-force button spring 111 should be understood as an optional measure for increasing the overall biasing force acting against the button 111, when necessary. In general, the more significant contribution to the overall biasing force is applied over the distal end to the button 110 where it abuts against a central part of the drive sleeve 150. This contact between the button 110 and the drive sleeve 150 preferably restricts to a point-like bearing 152 that allows relative rotation at very low friction. The drive sleeve 150 is arranged within the housing 102, movable along the longitudinal axis X and rotatable about the longitudinal axis X depending on an axial position of the drive sleeve 150. A spline 151 is arranged between the drive sleeve 150 and the housing 102 to prevent rotation of the drive sleeve 150 when the drive sleeve 150 is in a proximal position. The spline 151 is adapted to disengage when the drive sleeve 150 is moved into a distal position so that the drive sleeve 150 can rotate. A plunger 160 is arranged within the housing 102 and within the drive sleeve 150, the plunger 160 being movable along the longitudinal axis X and adapted to push a piston (not shown) within a medicament container such as a cartridge (not shown) or syringe. A plunger spline 161 is arranged to prevent rotation of the plunger 160 relative to the housing 102. The plunger 160 comprises an external thread 162. A drive nut 170 is arranged within the housing 102. The drive nut 170 comprises an internal thread 171 engaging the external thread 162 of the plunger 160. An axial bearing 172 is arranged between the drive nut 170 and the housing 102 to prevent or limit axial movement of the drive nut 170 relative to the housing 102. A sleeve spring 180 is arranged between the drive sleeve 150 and the drive nut 170 biasing the drive sleeve 150 and the drive nut 170 apart along the longitudinal axis X. A drive spline 173 between the drive sleeve 150 and the drive nut 170 couples the drive sleeve 150 and the drive nut 170 for joint rotation relative to the housing 102 but allows for axial movement of the drive sleeve 150 relative to the drive nut 170. If the button 110 is depressed, the drive sleeve 150 is moved from the proximal position into the distal position disengaging the spline 151 so that the system comprising the drive sleeve 150 and the drive nut 170 can rotate. The rotation may be caused by a drive mechanism comprising a torsion spring (not shown) rotating the drive sleeve 150 and/or the drive nut 170 relative to the housing 102 so that the plunger 160 is moved in the distal direction D to displace the piston within the cartridge or syringe. The drive mechanism and the limitation of the rotation angle corresponding to a set or available dose is known in the art, e.g. WO 2014/166909, WO 2017/001692, WO 2010/149209 which are incorporated herein by reference.

Upon depression of the button 110, the force acting on the button 110 due to this depression is propagated through the point bearing 152, the drive sleeve 150 and the sleeve spring 180 into the drive nut 170 contributing to a minimum actuation force in addition to the button spring 111 required to trigger an injection. As the sleeve spring 180 does not bear against the housing 102 in the distal direction D but against the drive nut 170, this force propagation can also relieve the axial bearing 172 fully or partially from the reaction force of the plunger 160. This reaction force occurs when the drive nut 170 rotates pushing the plunger 160 in the distal direction D. Consequently, the drive nut 170 is pushed in the proximal direction P against the axial bearing 172 causing friction so that part of the torque from the drive spring is dissipated. By relieving the axial bearing due to depression of the button 110, the friction can be reduced. Part of the reaction force is thus diverted from the axial bearing 172 to the point bearing 152 which generates significantly less friction than the axial bearing 172. This, in instances, may allow to implement the axial bearing 172 at reduced cost, in particular using sliding bearing rather than ball bearing, to comply with economic constraints or needs.

Figure 5:
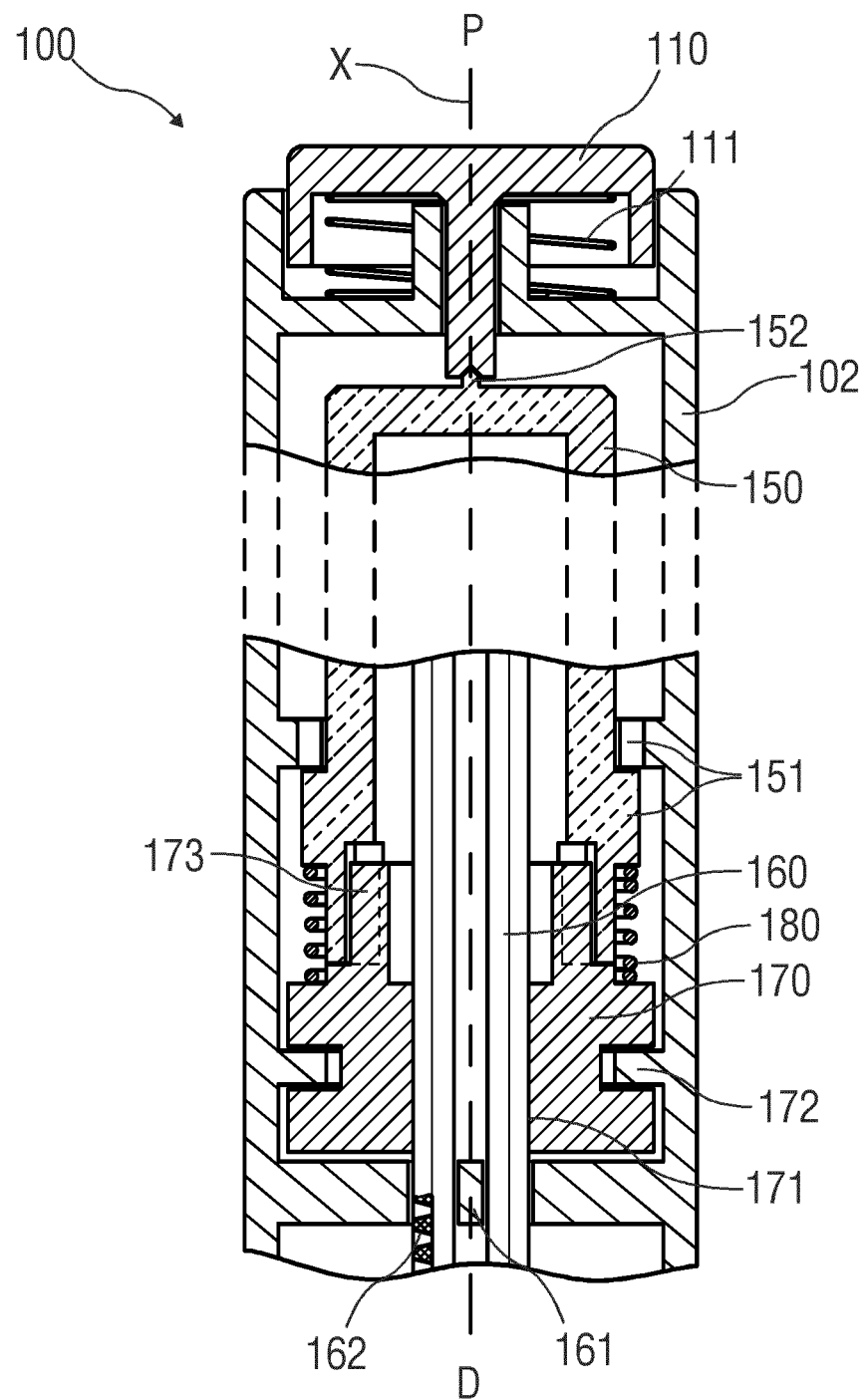
FIG. 5 is a schematic detail view of the drug delivery device with a depressed button.

FIG. 5 is a schematic view of the drug delivery device 100 with the button 110 being in a fully depressed position. In the outlined situation, there is enough bias or pre-strain provided in the packaging of the sleeve spring 180 in order to maintain a certain degree of axial force on the axial bearing 170 throughout all positions of the button 110. The almost practically relevant boundary condition is the force required for pressing the button 110 into the shown lower end position as this directly relates to the ability of an individual user for triggering the device for delivery of the drug. Additionally, there may be regulatory or other needs for having a minimal trigger force that prevents unintentional operation during handling. Someone skilled in the art will understand how spring rate and spring biasing has to be selected to achieve the desired behaviour. According to the respective choice, as the button 110 is being depressed, the compression of the sleeve spring 180 will cause the axial force to increase and the ability of relieving the axial bearing 170 from plunger 160 reaction force will increase in the same amount. Additionally, for providing further relief to the axial bearing 172, a second force path can be provided for shortcutting around the sleeve spring 180. In the depicted situation this is implemented by means of an abutment between the drive sleeve 150 and the drive nut 170 that occurs at a slightly offset point before the button 110 and the drive sleeve 15 reach their ultimate axial end positions. Subsequent travel of the drive sleeve 150 in the distal direction D between the offset point and the ultimate end position will therefore not cause further compression of the spring but will immediately push the axial bearing 172 downwards. In instances, this can be used for bringing the axial bearing 172 into a floating position wherein it effectively does not transfers any axial force to the housing. In such situation, the full extent of plunger 160 reaction force is supported in the point bearing 152 provided there is enough force on the button 110.

It should be understood that there is vast space for applying variations to these concepts for matching with the typical axial load situations in preferred use cases. Some situations may result in over-relieve, i.e. a state in which the said force propagation is fully resolved in the axial bearing 172 absent a reaction force from the plunger 160. This may for example occur if in an initial state a gap is provided between the plunger 160 and the piston of the cartridge or syringe which is a conventional configuration for handling tolerances. The sleeve spring 180 may thus be dimensioned such that given full force propagation into the axial bearing 172, the frictional torque of the axial bearing 172 is certain to be less than the drive torque of the drive mechanism. Otherwise, the drive mechanism might be incapable of closing said gap. However, an increase of friction in the axial bearing 172 due to an untypically low plunger 160 reaction force may be taken advantage of for creating a desired mechanism behaviour. For example, the layout of the axial bearing 172 might be carefully adjusted not to create a friction that would stall the drive mechanism even in full absence of any plunger reaction force 172 but to create a friction that merely slows down the rotation of the drive nut 170. This, in instances would allow protecting the drive nut 170 from speeding up in a situation where the plunger 160 has no contact to the cartridge bung. This might for example occur in an initial priming operation of a disposable device or after replacement of the cartridge in a reusable device. Speeding up of the drive nut 170 in such situation might result in rotational energy accumulation that causes high force peaks when the plunger 160 hits onto the bung or when the mechanism reaches a mechanical end stop feature. Preventing the mechanism from excessive acceleration and operation at high speed is not limited to purpose of avoiding damage but may also relate to the use case of avoiding excessively high expelling rates for therapeutic improvement or convenience reasons. An appropriate layout may, for example, help in reducing the dependency between the expelling rate and the gauge of the cannula mounted to the device. Smaller sized cannulas will require an increased plunger force for create the same flow rate as wider ones will do at lower forces. The explained frictional adjustment may be used for taking away a portion of the drive torque in a situation where the plunger 160 acts against a decreased force need.

The illustrated way of relieving the axial bearing 172 may reduce friction loss in the axial bearing 172 without generating the same losses in a different place. The point bearing generates only very low friction due to its low diameter. The disclosed solution thus mitigates a drawback which has been considered to be intrinsic in drive system based on a rotating nut as opposed to fulcrum shaft drives. Inherently, a drive system based on a rotating nut has at least the same friction loss than a fulcrum shaft drive because friction losses in a thread are the same at equal diameter, pitch and frictional coefficient. The same is true for the, in comparison, low friction loss from the sliding movement of the plunger 160 relative to the plunger spline 161. However, as opposed to conventional drive systems based on a rotating nut, greater friction losses can be avoided by the present solution. Conventional solutions without low-friction bracing of the drive nut 170 generate friction loss in the axial bearing 172 which, in conventional layouts, is at least as great as the friction loss in the thread because the axial bearing 172 surrounds the plunger 160 so the axial bearing 172 has a greater diameter than the thread. In conventional layouts, the axial bearing 172 bears the full reaction force from the plunger 160. With similar friction pairing, due to the same axial forces in the thread and in the axial bearing 172, the same linear friction force is operative in the thread and in the axial bearing 172. However, due to the greater diameter of the axial bearing 172, the friction torque loss in the axial bearing 172 is greater than in the thread.

One further aim of the embodiment of FIGS. 4 and 5 may be seen in preventing too high injection speed caused by low friction force of the piston for a drive nut spring driven device concept. The drive nut 170 is threaded to the plunger 160 and the plunger 160 is axially guided in the housing 102 or in an additional component, e.g. a plunger spline 161 or spline insert.

The axial bearing 172 is pushed in the proximal direction P during an injection by pushing the piston in the distal direction D. The force which is needed to move the piston is expected to be almost constant over one injection stroke; according to this the bearing output force of the mechanism may be estimated. But as the mechanism is not damped the injection may be too fast in case the force needed to move the piston is too low or missing as in the case of a gap.

In an exemplary embodiment, a clutch spring could be placed between a dial sleeve and a drive nut 170. The clutch spring force is pushing the drive nut 170 in the distal direction D. The drive nut 170 is pushed in the proximal direction P during dispense and the drive nut 170 abuts the axial bearing 172 in the proximal direction P. If the force to move the piston is too low or missing, the clutch spring would push the drive nut 170 in the distal direction D against a surface of the axial bearing 172 which may have specific frictional properties to generate high friction to slow down the rotation of the drive nut 170 and therefore decrease the injection speed. As soon as the force to move the piston is high enough, the drive nut 170 will back off in the proximal direction P again and will no longer be in contact to the high friction surface of the axial bearing 172.

The embodiment of FIGS. 4 and 5 may be combined with the embodiment of FIGS. 2 and 3.

Figure 6:
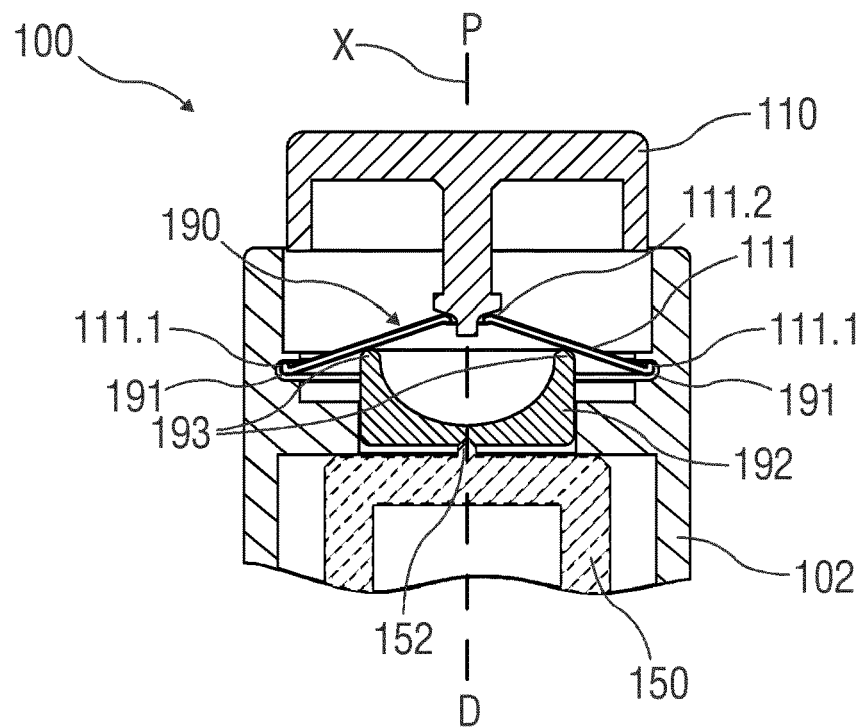
FIG. 6 is a schematic detail view of an exemplary embodiment of an drug delivery device.
Figure 7:
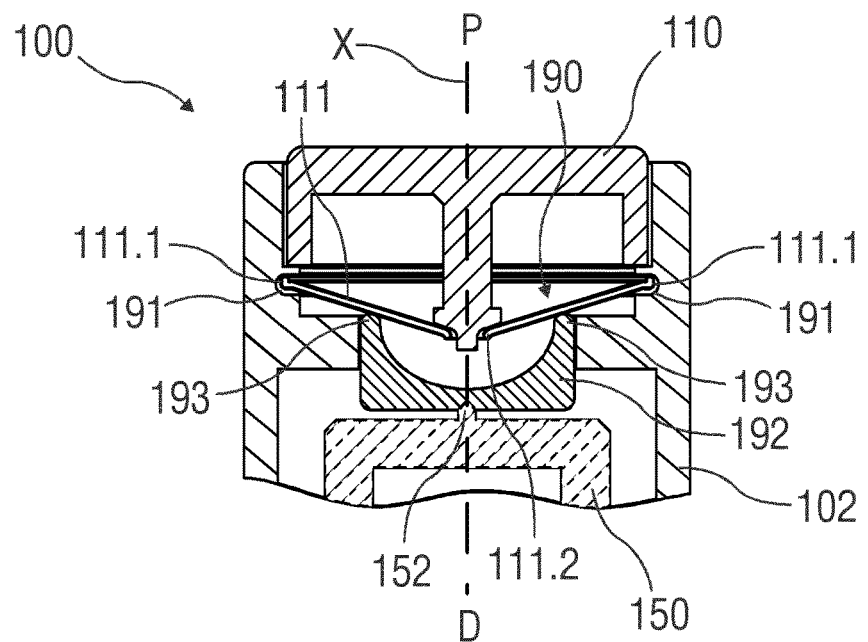
FIG. 7 is a schematic detail view of the drug delivery device with a depressed button.

FIG. 6 is a schematic detail view on a modification applied to the upper portion of the embodiments of FIGS. 4 and 5. provided in FIG. 6 where a force multiplier 190 is arranged in the uppermost portion of the force propagation path between the drive nut 170 and the button 110. In conventional layouts, the trigger button 110 typically provides a trigger force which is about half of the minimum force on the plunger 160. Thus, in the embodiment of FIGS. 4 and 5, the axial bearing 172 may not be fully relieved. The force multiplier 190 can remove this restriction, e.g., by transforming the actuation force acting on the button 110 by means of a support 191 on the housing 102. The benefit in placing the force multiplier 190 between the button 110 and the point bearing 152 becomes apparent when taking into account that the multiplier will require some support in the housing for providing the additional force. In the outlined situation, this support may be non-rotational and can there-fore avoid additional loss. Providing the force multiplier 190 downstream below the point bearing 152 would require means for rotational uncoupling the axial support in the housing from the drivetrain rotation. In the illustrated embodiment, the force multiplier 190 may comprise a button spring 111 configured as a diaphragm spring which is part of the non-rotating part of the force propagation path. An outer edge 111.1 of the button spring 111 is coupled to the support 191 while a center region 111.2 of the button spring 111 is engaged by the button 110. An intermediate part 192 is arranged between the button spring 111 and the drive sleeve 150 such that the point bearing 152 is between the intermediate part 192 and the drive sleeve 150. The intermediate part 192 comprises a number of proximal protrusions or a circumferential proximal edge 193 engaged by a part of the button spring 111 between the outer edge 111.1 and the center region 111.2. Depending on the location where the button spring 111 engages the intermediate part, the force from the button 110 propagated to the intermediate part 192 is amplified while the travel is reduced. FIG. 7 is a schematic detail view of the drug delivery device with the button 110 depressed. The embodiment of FIGS. 5 and 6 allows for a nearly full relieve of the axial bearing 172 of the embodiment of FIGS. 3 and 4.

Figure 8:
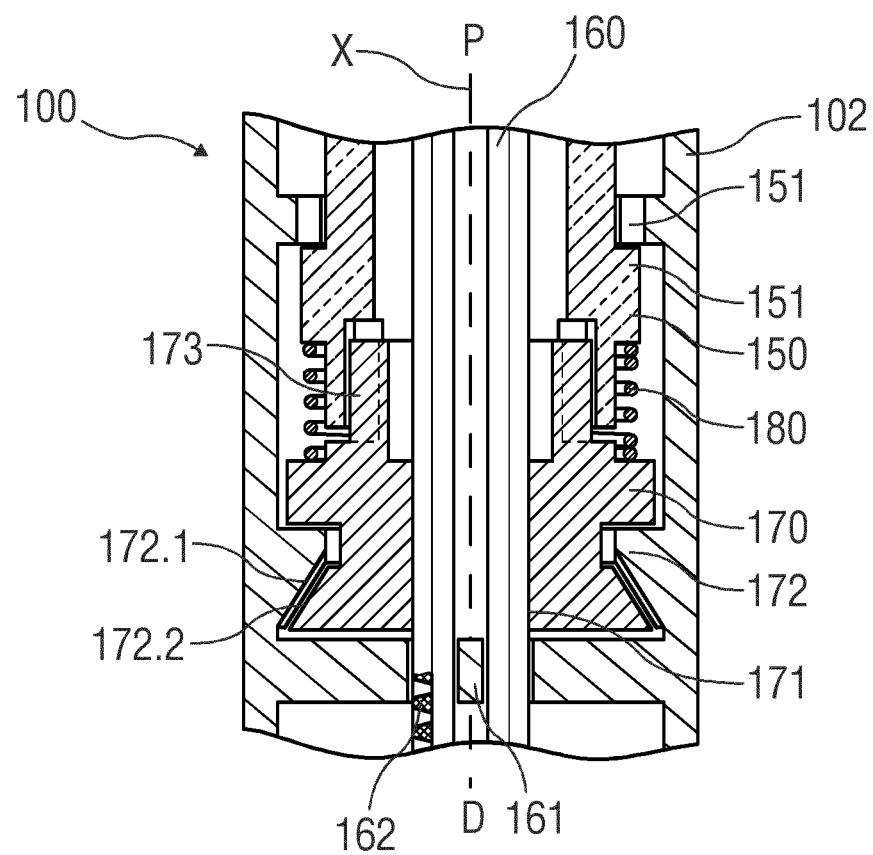
FIG. 8 is a schematic detail view of an exemplary embodiment of an drug delivery device.
Figure 9:
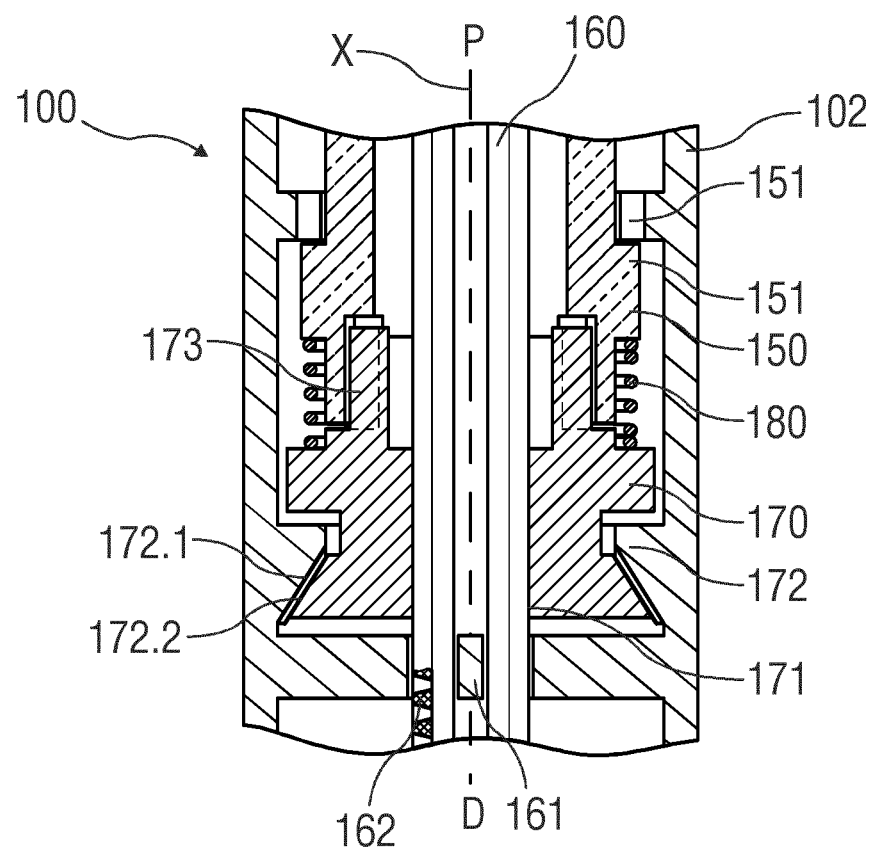
FIG. 9 is a schematic detail view of the injection device.

FIG. 8 is a schematic view of an exemplary embodiment of a drug delivery device 100, e.g., an injection pen adapted to receive a non-shown cartridge containing a drug. The embodiments of FIGS. 2 to 7 may be modified by the embodiment shown in FIG. 8. In the embodiment of FIG. 8, the axial bearing 172 is configured to have reduced friction in only one direction of load, e.g., in the distal direction D, but configured to act as a brake in the opposite direction of force, e.g., in the proximal direction P, i.e., the direction of the reaction load from the plunger 160. In an exemplary embodiment, the axial bearing 172 may comprise matching surfaces 172.1, 172.2 on the housing 102 and on the drive nut 170, wherein the matching surfaces 172.1, 172.2 taper in the proximal direction P. As the reaction force from the plunger 160 increases, the matching surfaces 172.1, 172.2 engage each other as shown in FIG. 9 so the friction in the axial bearing 172 also increases thus reducing the drive torque effective on the drive nut 170. This may be used to limit the axial force of the plunger 160. The drive sleeve 150 and drive nut 170 may be configured to allow for some free travel between them in this situation, i.e., they do not necessarily abut against each other.

There follows a list of exemplary embodiments:

Embodiment 1. A drug delivery device (100), comprising:
  a housing (102),
  a plunger (160) arranged within the housing (102), the plunger (160) being movable along a longitudinal axis (X) and adapted to push a piston within a medicament container, the plunger (160) having an external thread (162) engaged to an internal thread (171) on a component of the drug delivery device (100)
  a dosing mechanism comprising a torsion spring configured to exert a drive torque on the plunger (160) or on the component having the internal thread (171) to advance the plunger (160) in a distal direction (D),
  a dialling mechanism adapted to be rotatably operated to tension the torsion spring, and
  a friction arrangement generating a frictional torque opposing the torque from the torsion spring when rotating the dialling mechanism.

Embodiment 2. The drug delivery device (100) according to embodiment 1, wherein the friction arrangement is configured to generate high frictional torque at high dialled doses with the frictional torque decreasing with decreasing dialled doses.

Embodiment 3. The drug delivery device (100) according to embodiment 1 or 2, wherein the dialling mechanism comprises:
a dial button (110) adapted to be rotated to select a variable dose size.

Embodiment 4. The drug delivery device (100) according to any one of the embodiments 1 to 3,
wherein the dialling mechanism comprises:
a scale drum (120), axially fixed in the housing (102) and adapted to be rotated when a dose is being set, the scale drum (120) being coupled to the dial button (110) to follow rotation of the dial button (110) at least in one rotational direction.

Embodiment 5. The drug delivery device (100) according to embodiment 4, wherein the scale drum (120) comprises an outer surface provided with a helical track or thread (121), wherein a slider (130) is rotationally fixed in the housing (102) and has a male thread (131) engaging the thread (121) so as to be translated axially upon rotation of the scale drum (120), Embodiment 6. The drug delivery device (100) according to embodiment 4 or 5, wherein the scale drum carries indicia (122) indicating a dialled dose.

Embodiment 7. The drug delivery device (100) according to embodiment 5 or 6, wherein the slider (130) is provided with a window (135) through which a user can view the scale drum (120), wherein the housing (102) is provided with a longitudinal window (103) angularly aligned with the window (135) of the slider (130).

Embodiment 8. The drug delivery device (100) according to any one of embodiments 5 to 7, wherein the slider (130) is further provided with a helical guiding surface (136.1, 136.2) which interacts with a helical opening (141) in a sleeve (140) so that when the slider (130) slides axially it forces the sleeve (140) to rotate due to this engagement between the opening (141) and the guiding surface (136.1, 136.2) of the slider (130).

Embodiment 9. The drug delivery device (100) according to embodiment 8, wherein at its proximal end the sleeve (140) has a collar which rests on the scale drum (120) without being fixed to the scale drum (120).

Embodiment 10. The drug delivery device (100) according to any one of embodiments 8 or 9, wherein the helical opening (141) has a width slightly increasing towards the distal direction (D), wherein at least one of the guiding surfaces (136.1, 136.2) is configured as a resilient beam having a fixed end (136.2.1) attached to the slider (130) and a free end (136.2.2) opposite the fixed end (136.2.1), the resilient beam being configured to frictionally engage an edge of the helical opening (141).

Embodiment 11. The drug delivery device (100) according to embodiment 10, the resilient beam has a bump (136.2.3) configured to contact the edge of the helical opening (141).

The injection device may comprise a cartridge containing a liquid drug or medicament. In instances, by pressing the injection button a portion thereof may be expelled from the cartridge according to the dialled or pre-set amount. The terms "drug" and "medicament", may refer to a pharmaceutical formulation containing at least one pharmaceutically active compound. More details on particular pharmaceutical formulations may be taken from the disclosure of the co-pending application PCT/EP2018/082640, which, to this extent, shall be included herein by reference.

Those of skill in the art will understand that modifications (additions and/or removals) of various components of the substances, formulations, apparatuses, methods, systems and embodiments described herein may be made without departing from the full scope and spirit of the present disclosure, which encompass such modifications and any and all equivalents thereof.

LIST OF REFERENCES 10 device
11 housing
11a window
12 cap assembly
13 needle sleeve
14 carrier
17 needle
20 distal region
21 proximal region
22 button
23 piston
24 container, syringe
30 drive spring
40 plunger
100 drug delivery device
102 housing
103 window
105 longitudinal border
106 transversal border
110 button
111 button spring
111.1 outer edge
111.2 center region
120 scale drum
121 helical track, helical thread
122 indicia
130 slider
131 male thread
132 peripheral part
133 extension
135 window
136.1 helical guiding surface
136.2 helical guiding surface
136.2.1 fixed end
136.2.2 free end
136.2.3 bump
140 sleeve
141 helical opening
141.1 proximal edge
141.2 distal edge
144 peripheral area
150 drive sleeve
151 spline
152 point bearing
160 plunger
161 plunger spline
162 external thread
170 drive nut
171 internal thread
172 axial bearing
172.1 matching surface
172.2 matching surface
173 drive spline
180 sleeve spring
190 force multiplier 191 support
192 intermediate part
193 proximal edge
D distal end, distal direction
P proximal end, proximal direction
X longitudinal axis

The invention claimed is:

1. A drug delivery device, comprising:
a housing,
a plunger arranged within the housing, the plunger being movable along a longitudinal axis and adapted to push a piston within a medicament container in a distal direction, the plunger being prevented from rotating and comprising an external thread,
a drive nut arranged within the housing, the drive nut comprising an internal thread engaging the external thread of the plunger, wherein an axial bearing is arranged between the drive nut and the housing to prevent or limit axial movement of the drive nut relative to the housing,
a mechanism configured to exert a force on the drive nut in the distal direction through at least one rotatable component coupled to the drive nut for a joint rotation and at least one non-rotatable component, wherein a bearing is arranged between the at least one rotatable component and the at least one non-rotatable component, the bearing having a smaller diameter than the axial bearing,
wherein the at least one rotatable component comprises a drive sleeve arranged in the housing and movable along the longitudinal axis between a proximal position in which the drive sleeve is prevented from rotating and a distal position in which the drive sleeve is allowed to rotate about the longitudinal axis,
wherein the drive nut and the drive sleeve are coupled for the joint rotation but allowed to move axially relative to each other,
wherein the drug delivery device further comprises a spline arranged between the drive sleeve and the housing to prevent rotation of the drive sleeve when the drive sleeve is in the proximal position, wherein the spline is adapted to disengage when the drive sleeve is moved into the distal position so that the drive sleeve can rotate, and
wherein the drug delivery device further comprises a drive spline arranged radially between the drive sleeve and the drive nut.

2. The drug delivery device according to claim 1, wherein the at least one non-rotatable component comprises a button configured to be depressed in the distal direction.

3. The drug delivery device according to claim 2, wherein the button abuts the drive sleeve at least when being depressed.

4. The drug delivery device according to claim 1, wherein the at least one rotatable component further comprises a sleeve spring arranged between the drive sleeve and the drive nut, and biasing the drive sleeve and the drive nut apart along the longitudinal axis.

5. The drug delivery device according to claim 2, further comprising a drive mechanism configured to exert a drive torque on the drive sleeve and/or on the drive nut.

6. The drug delivery device according to claim 5, wherein the at least one rotatable component further comprises a sleeve spring arranged between the drive sleeve and the drive nut, and biasing the drive sleeve and the drive nut apart along the longitudinal axis, and the sleeve spring is dimensioned such that upon full depression of the button, the frictional torque of the axial bearing is less than the drive torque of the drive mechanism.

7. The drug delivery device according to claim 5, wherein the drive mechanism comprises a torsion spring configured to rotate the drive sleeve and/or the drive nut relative to the housing.

8. The drug delivery device according to claim 2, wherein at full depression of the button, the drive sleeve is configured to abut the drive nut.

9. The drug delivery device according to claim 2, wherein the bearing is a point bearing.

10. The drug delivery device according to claim 9, wherein the button engages the drive sleeve in the point bearing.

11. The drug delivery device according to claim 2, further comprising a button spring biasing the button in a proximal direction.

12. The drug delivery device according to claim 11, wherein a force multiplier is arranged in a force propagation path between the drive nut and the button.

13. The drug delivery device according to claim 12, wherein the force multiplier comprises at least one support on the housing, wherein the button spring is configured as a diaphragm spring which is part of a non-rotating part of the force propagation path, wherein an outer edge of the button spring is coupled to the support while a center region of the button spring is engaged by the button, wherein an intermediate part is arranged between the button spring and the drive sleeve such that the bearing is between the intermediate part and the drive sleeve.

14. The drug delivery device according to claim 13, wherein the intermediate part comprises a number of proximal protrusions or a circumferential proximal edge engaged by a part of the button spring between the outer edge and the center region.

15. The drug delivery device according to claim 1, further comprising a plunger spline arranged to prevent rotation of the plunger relative to the housing.

16. The drug delivery device according to claim 1, wherein the axial bearing is configured to have reduced friction in the distal direction of a load but configured to act as a brake in a proximal direction of the load.

17. The drug delivery device according to claim 1, wherein the axial bearing comprises matching surfaces on the housing and on the drive nut, wherein the matching surfaces taper in a proximal direction.

18. The drug delivery device according to claim 1, wherein the drive spline couples the drive sleeve and the drive nut for joint rotation relative to the housing but allows for axial movement of the drive sleeve relative to the drive nut.

* * * * *